United States Patent
Robinson

[11] Patent Number: 6,098,949
[45] Date of Patent: Aug. 8, 2000

[54] MOUNTING ARRANGEMENT FOR SUPPORTING A HYDRAULIC CONTROL UNIT OF A VEHICULAR BRAKING SYSTEM

[75] Inventor: David S. Robinson, Ann Arbor, Mich.

[73] Assignee: Kelsey Hayes Company, Livonia, Mich.

[21] Appl. No.: 09/270,618

[22] Filed: Mar. 17, 1999

Related U.S. Application Data

[63] Continuation of application No. PCT/US97/16295, Sep. 16, 1997.
[60] Provisional application No. 60/025,268, Sep. 17, 1996.

[51] Int. Cl.[7] .................................................. F16M 13/00
[52] U.S. Cl. ......................... 248/635; 248/609; 248/659; 267/141.2
[58] Field of Search .................................... 248/659, 634, 248/609, 635; 267/141, 141.2, 141.3

[56] References Cited

U.S. PATENT DOCUMENTS

| | | | |
|---|---|---|---|
| 2,724,588 | 11/1955 | Sheets | 267/141.1 |
| 4,391,436 | 7/1983 | Fishbaugh | 267/141.1 |
| 4,424,960 | 1/1984 | Dan et al. | 267/141 |
| 4,535,976 | 8/1985 | Dan et al. | 267/141 |
| 4,579,184 | 4/1986 | Hiramoto | 180/68.4 |
| 5,100,114 | 3/1992 | Reuter et al. | 267/293 |
| 5,170,985 | 12/1992 | Killworth et al. | 248/635 |
| 5,464,187 | 11/1995 | Linkner, Jr. . | |
| 5,549,271 | 8/1996 | Hamaekers | 248/621 |
| 5,580,028 | 12/1996 | Tomeczak et al. | 248/634 |
| 5,636,826 | 6/1997 | Nakagaki et al. | 248/562 |
| 5,743,509 | 4/1998 | Kanda et al. | 248/635 |
| 5,799,923 | 9/1998 | Carr et al. | 248/635 |
| 5,842,677 | 12/1998 | Sweeney et al. | 248/635 |

Primary Examiner—Ramon O. Ramirez
Assistant Examiner—Walter Landry
Attorney, Agent, or Firm—MacMillan, Sobanski & Todd, LLC; A. Michael Tucker

[57] ABSTRACT

A mounting arrangement for attaching a hydraulic control unit of a vehicular braking system to a vehicle body includes a mounting stud attached to and extending axially outward from the hydraulic control unit. The mounting stud also includes axially and laterally extending surfaces. A bracket is secured to a selected portion of the vehicle body. The bracket is provided with a mounting arm having a hole through which the mounting stud extends. The bracket also includes a recessed portion surrounding the hole and axially spaced from a main portion of the arm. The recessed portion and the main portion are connected by a transitional portion. A grommet is located between the mounting arm and the mounting stud. The grommet engages both the recessed portion and the transitional portion of the mounting arm and engages the axially and laterally extending surfaces of the mounting stud for supporting the hydraulic control unit in both axial and lateral directions.

17 Claims, 4 Drawing Sheets

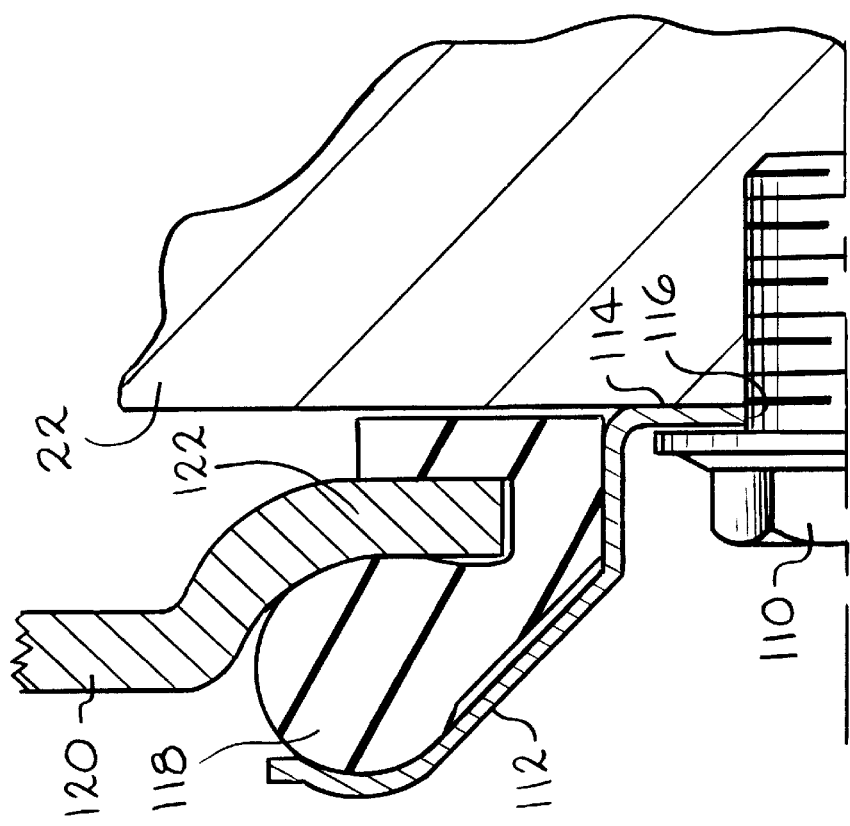
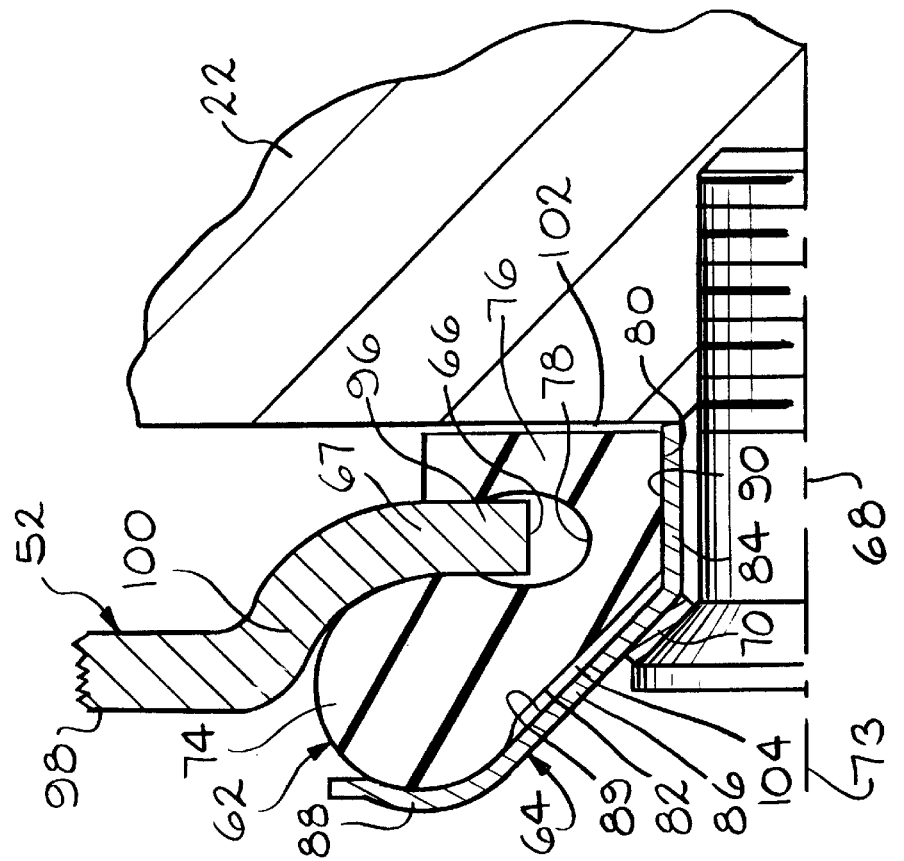

MOUNTING ARRANGEMENT FOR SUPPORTING A HYDRAULIC CONTROL UNIT OF A VEHICULAR BRAKING SYSTEM

CROSS-REFERENCE TO RELATED APPLICATION

This application is a continuation of PCT/US97/16295 filed Sep. 16, 1997.

This application claims the benefit of United States Provisional patent application identified as application No. 60/025,268, filed Sep. 17, 1996.

BACKGROUND OF THE INVENTION

This invention relates in general to a mounting arrangement which dampens acoustical noise and vibration resulting from the operation of a hydraulic control unit for a vehicular braking system.

Anti-lock braking systems are used in vehicles to maintain control and prevent wheel lock-up under adverse conditions such as rain, snow or ice. The speed of the vehicle's wheels is monitored and application of hydraulic pressure to the brakes is controlled. Anti-lock brake systems typically include a hydraulic control unit which cyclically relieves and reapplies pressure to the brakes through a plurality of solenoid actuated valves housed in the unit. The hydraulic control unit may also house a motor driven reciprocating pump which supplies pressurized brake fluid for operation of the system. The operation of the solenoid valves and reciprocating pump generates vibrations which can be objectionable to vehicle occupants. In particular, the vibrations are caused by the opening and closing of the solenoid valves and the reactionary forces caused by the motor's rotation. These vibrations generate an acoustical noise which consists of sound energy transmitted through the air and vehicle body members to the passenger compartment.

A mounting bracket having several mounting arms is typically used to fasten the hydraulic control unit to the vehicle body. A grommet is placed on each mounting arm between the hydraulic control unit and the surface of the mounting arm. Each grommet is formed from a resilient elastomeric material, such as rubber, for supporting and isolating the hydraulic control unit from the mounting bracket.

An example of a prior art mounting arrangement for attaching a hydraulic control unit to a vehicle body is shown in FIG. 1. The mounting arrangement includes a mounting bracket support arm 10 having an annular indentation portion 12. The indentation portion 12 has an opening 14 through which a stud 16 extends. The stud 16 includes a hexagonal shaped head 18 having six associated edges 19 and a threaded portion 20. The stud 16 is threadedly fastened to a hydraulic control unit 22. A rubber grommet 24 is located between the indentation portion 12 of the support arm 10 and the stud 16. The grommet 24 has a circular hole 26 having an internal cylindrical wall for receiving the hexagonal bead 18 of the stud 16. The six associated edges 19 of the hexagonal head 18 separately contact the cylindrical wall of the grommet 24. Vibrations generated by the hydraulic control unit 22 are transmitted through the edges and are dampened by the rubber grommet 24.

Another example of a prior art mounting arrangement is shown in FIG. 2 and includes a mounting bracket support arm 30 having a hole 32 and a generally cylindrical rubber grommet 34. The grommet 34 has an outer annular groove 36 which extends circumferentially around the grommet 34. The grommet 34 has a central hole 38 through which a tubular metal retaining sleeve 40 is inserted. The retaining sleeve 40 has a flanged outer end 42 which cooperates with a mounting bolt 44 to fasten the hydraulic control unit 22 relative to the support arm 30. An undesirable effect of tightening the bolt 44 is the compression of the rubber grommet 34 by the flanged end 42 of the retaining sleeve 40. This compression reduces the dampening capabilities by decreasing the flexibility of the rubber grommet 34.

SUMMARY OF THE INVENTION

This invention includes a mounting arrangement for a hydraulic control unit of a vehicular braking systems. The mounting arrangement dampens acoustical noise and vibrations resulting from operation the hydraulic control unit during braking event.

In a preferred embodiment, a mounting arrangement for attaching a hydraulic control unit of a vehicular braking system to a vehicle body includes a mounting stud attached to and extending axially outward from the hydraulic control unit. The mounting stud also includes axially and laterally extending surfaces. A bracket is secured to a selected portion of the vehicle body. The bracket is provided with a mounting arm having a hole through which the mounting stud extends. The bracket also includes a recessed portion surrounding the hole and axially spaced from a main portion of the arm. The recessed portion and the main portion are connected by a transitional portion. A grommet is located between the mounting arm and the mounting stud. The grommet engages both the recessed portion and the transitional portion of the mounting arm and engages the axially and laterally extending surfaces of the mounting stud for supporting the hydraulic control unit in both axial and lateral directions.

Other features and advantages of the present invention will become readily apparent to one skilled in the art from reading the following detailed description in conjunction with the attached drawings.

BRIEF DESCRIPTION OF THE DRAWINGS

FIG. 4 is a sectional view taken along line 4—4 of FIG. 3 illustrating a grommet between a support arm and an insert.

FIG. 5 is a sectional view of a second embodiment of a mounting arrangement according to the present invention.

DETAILED DESCRIPTION OF THE PREFERRED EMBODIMENTS

Figure 3:
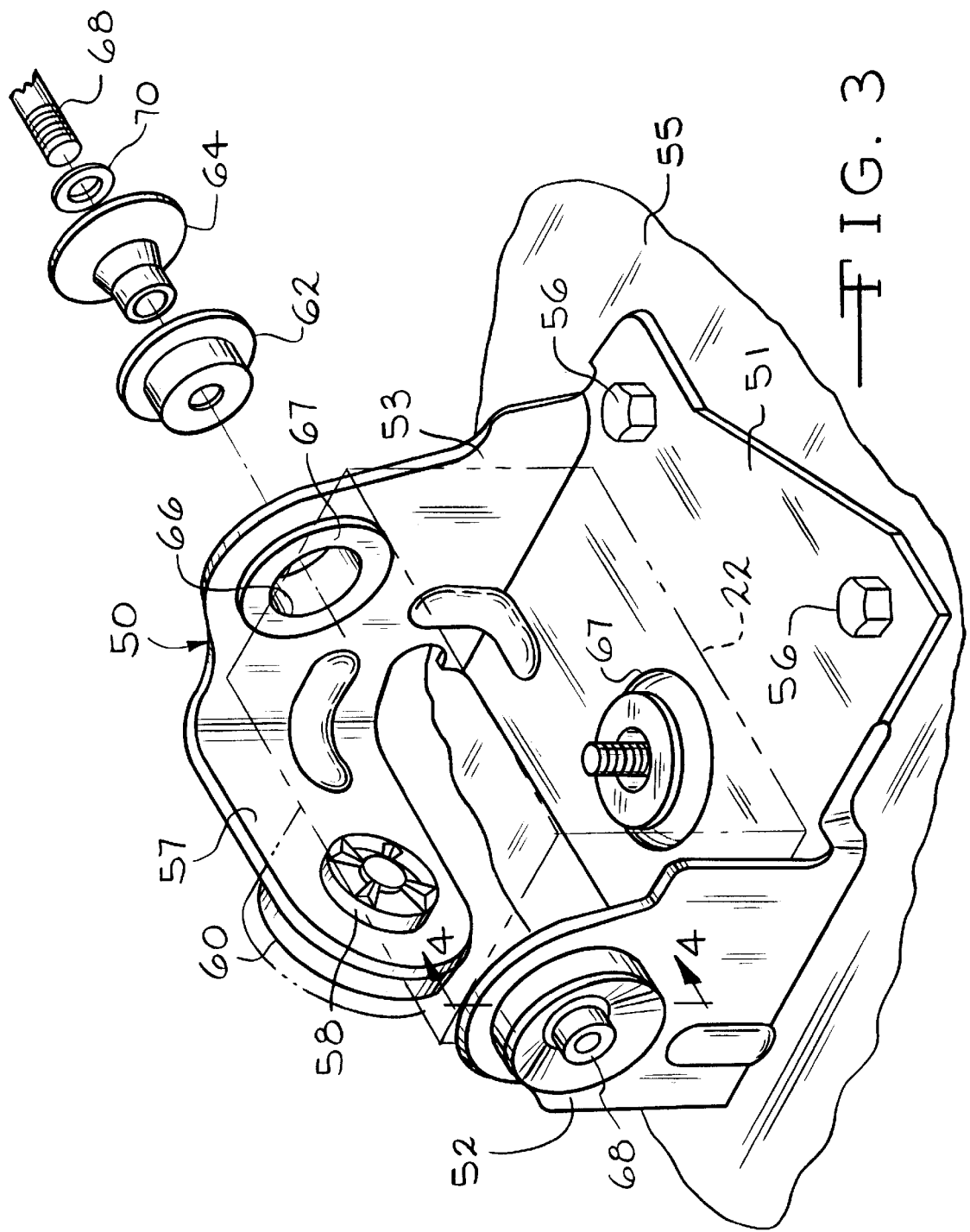
FIG. 3 is a partially-exploded perspective view of a first embodiment of a mounting arrangement according to the present invention illustrating a mounting bracket attached to a vehicle body.

FIG. 3 illustrates a first embodiment of a mounting arrangement according to this invention including a mounting bracket 50 supporting a hydraulic control unit 22, which is represented in phantom by broken lines. The mounting bracket 50 can be manufactured from steel or other suitable materials and can be formed by conventional means, such as stamping and bending. The bracket 50 includes a base portion 51 and a pair of opposed, upwardly-projecting support arms 52 and 53. The base portion 51 is attached to a selected portion of a vehicle body 55 by a plurality of mounting bolts 56. An extension arm 57 extends from the support arm 53 upon which a rubber isolator 58 is mounted. The isolator 58 directly contacts a motor 60 (illustrated in phantom) mounted on the hydraulic control unit 22 and specifically provides for dampening of vibration and acoustical noise emanating from the motor 60.

As shown in FIG. 3, the hydraulic control unit 22 is fastened to the mounting bracket 50 at its bottom and two opposed sides. At each of these three attachment points, one of which is shown in exploded perspective, a grommet 62 and an insert 64 are provided. Each grommet 62 and insert 64 is mounted within a respective hole 66 formed through the mounting bracket base portion 51 and the support arms 52 and 53. Surrounding each hole 66 is an annular recessed portion 67 which extends axially from the bracket 50 in a direction towards the hydraulic control unit 22. A mounting stud 68 and washer 70 are used to secure the hydraulic control unit 22 to the bracket 50. Preferably, the three attachment points define a plane that passes through the center of gravity of the hydraulic control unit 22. This placement provides for even support of the hydraulic control unit 22.

As illustrated best in FIG. 4, each grommet 62 has a specific annular shape defined about a longitudinal axis 73. Preferably, each grommet 62 is formed from a resilient elastomeric material, such as rubber, having sufficient dampening characteristics. Each grommet 62 includes an annular ring 74 on one end and an annular lip 76 on the opposing end. These two regions are separated by an annular groove 78 for receiving the annular recessed portion 67 surrounding a hole 66 of the bracket 50. The annular ring 74 is generally circular in cross-section and has an outer torus shape. The annular lip 76 is preferably thinner than the annular ring 74 and is shaped much like a relatively thin cylindrical disc. Each grommet 62 has an axial hole 80 which adjoins a conical recess 82 located at the end of a grommet 62 defined by the annular ring 74.

Insertion of the grommet 62 into the hole 66 of the support arm 52 is each accomplished by first inverting the grommet 62 inside itself to invert the grommmet 62, the annular lip 76 is compressed and inserted internally through the hole 80 of the grommet 62. The now exposed end of the annular ring 74 is held against the recessed portion 67 of the support arm 50 and the annular lip 76 is pushed through the hole 66 of the bracket 50. The annular lip 76 will return to its normal position and surround the edge of hole 66, thus securing the grommet 62 onto the bracket support arm 52.

The insert 64 can be formed by conventional means, such as by stamping, and is preferably manufactured from steel or other suitable materials. The insert 64 includes a tubular region 84 having an opening 85 adjoining to a conical region 86. An annular flange 88 extends radially outwardly from the conical region 86. The annular flange 88 of insert 64 has an axially and laterally extending surface defined by an arcuate shape that partially encircles the annular ring 74. This arcuate shape enables the annular flange 88 to support the grommet 62 in a lateral direction.

Figure 2:
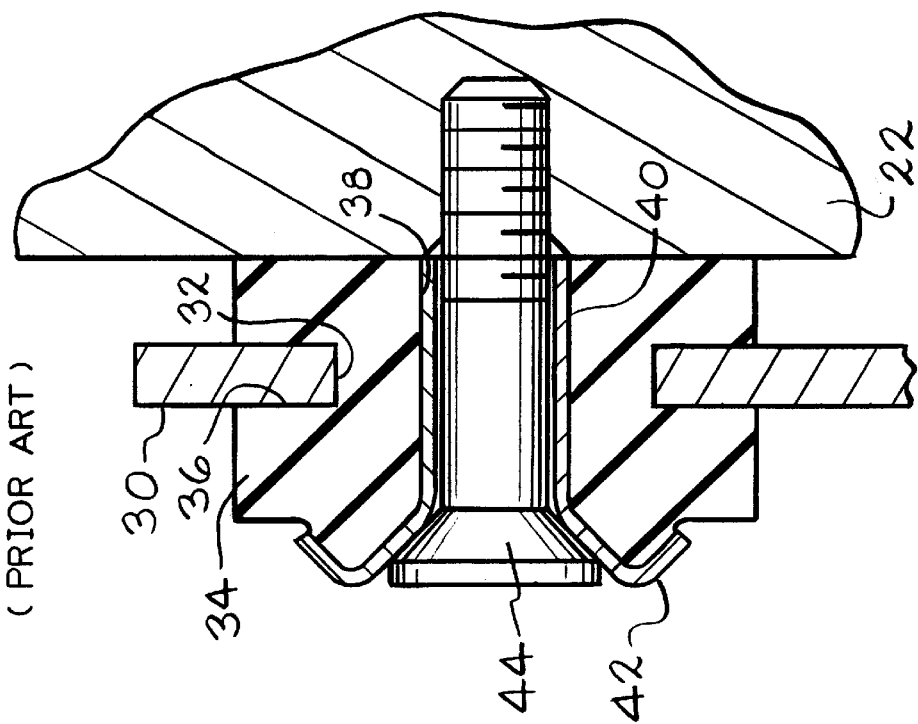
FIG. 2 is a sectional view of another prior art mounting arrangement for a hydraulic control unit.
Figure 1:
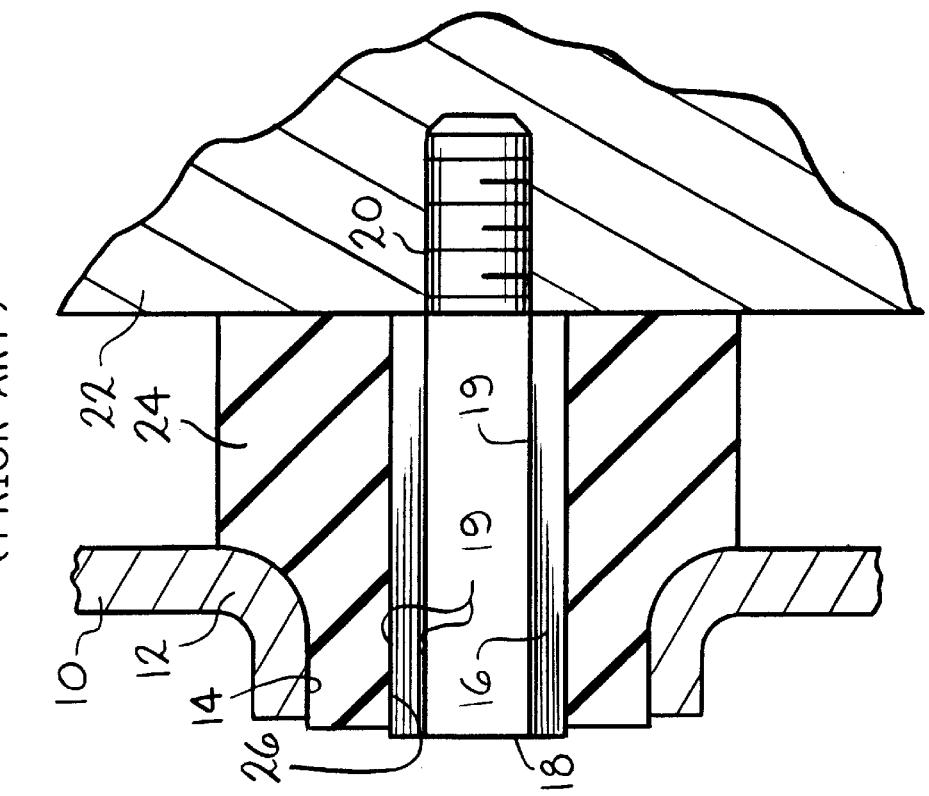
FIG. 1 is a sectional view of a prior art mounting arrangement for a hydraulic control unit of a vehicular braking system.

As is illustrated in FIG. 4, the grommet 62 engages the mounting bracket support arm 52 at the recessed portion 67. The recessed portion 67 is axially spaced away from a main portion 98 of the support arm 52 and towards the hydraulic control unit 22. The recessed portion 67 and the main portion 98 are connected by a transitional portion 100. The transitional portion 100 has an arcuate shape that partially encircles the annular ring 74 and provides for both axial and lateral support. The arcuate shape of the transitional portion 100 and annular ring 74 provides for a uniform distribution of both the axial and lateral vibrational forces inflicted upon the grommet 62. A uniform distribution prevents concentrated forces from deteriorating the resilient material of the grommet 62. The grommet 34 of FIG. 2, by contrast, has concentrated forces acting upon the sharp edges at the point where the annular groove 36 and hole 32 of the non-recessed bracket support arm 30 meet. To compensate for the deterioration, a resilient material having a higher durometer may be used to extend the useful life of the grommet 34. However, decreasing the flexibility of the grommet 34 reduces its ability to dampen vibration and thus leads to an undesirable result.

As shown in FIG. 4, a relatively slight or small gap 102 exists between the annular lip 76 and the surface of the hydraulic control unit 22. The gap 102 prevents axial vibrational forces from being directly transmitted from the hydraulic control unit 22 to the bracket 50 through the annular lip 76. The annular lip 76 mainly provides for a means for securing the grommet 62 to the bracket 50 during assembly. Only under over-stressed conditions, in which a large radial force is exerted on the grommet 62, will the annular lip 76 provide support. The majority of vibrational forces, therefore, must pass through the annular ring 74, which has the largest cross-sectional area of the grommet 62. A larger area provides more volume of resilient material to dampen vibrational forces. Although a large area is desirable, a low axial height is also beneficial for tight packaging constraints for mounting the hydraulic control unit 22 inside the vehicle. The embodiments of the present invention balance these two desirable qualities.

FIG. 5 shows a second embodiment of a mounting arrangement according to this invention in which a hex-head mounting stud 110 cooperates with an insert 112 having a flat end 114. The hex-head stud 110 extends into a hole 116 of the flat end 114 and secures the insert 112 to the hydraulic control unit 22. The insert 112 cooperates with a grommet 118 and a mounting bracket support arm 120 having a recessed portion 122 in the same manner as recessed portion 67 of the embodiment of FIG. 4. The only significant differences between the embodiments of FIGS. 4 and 5 are the mounting bolt construction and the increased diameters of the insert 112, the grommet 118, and the recessed portion 122 of the support arm 120.

Figure 6:
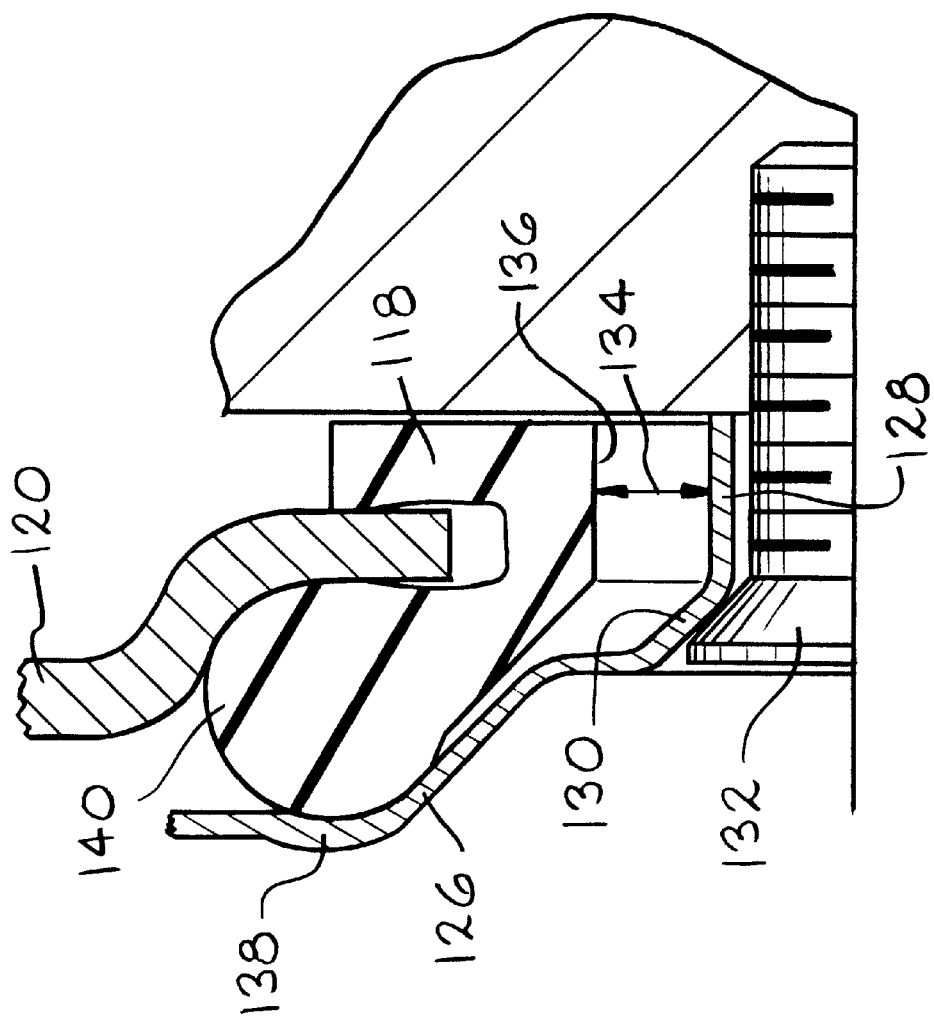
FIG. 6 is a sectional view of a third embodiment of a mounting arrangement according to the present invention.

FIG. 6 illustrates a third embodiment of a mounting arrangement according to this invention having the same mounting bracket support arm 120 and grommet 118 of FIG. 5, but cooperating with an insert 126 having a tubular region 128 and conical region 130 for supporting a conical flat head stud 132. Stud 132 may be the same size as stud 68 shown in FIG. 4, thus eliminating the need for multiple stud sizes. The significant difference between the mounting arrangements of FIG. 6 and FIG. 4 is the existence of a gap 134 preventing contact between the tubular region 128 and a cylindrical wall 136 of grommet 118. All contact between the insert 126 and grommet 118 exists at an annular flange 138 of the insert 126. The annular flange 138 has an arcuate shape and partially surrounds an annular ring 140 of grommet 118. The arcuate shape of the flange 138 defines an axially and laterally extending surface that provides all of the axial and lateral support between the insert 126 and grommet 118.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A mounting arrangement for attaching a hydraulic control unit of a vehicular braking system to a vehicle body comprising:

a bracket having a hole surrounded by a recessed portion spaced from a main portion by a transitional portion having an arcuate shape;

a grommet mounted in the hole of the bracket, the grommet including an axial hole and an annular ring separated by an annular groove from an annular lip, wherein the annular ring is supported by the transitional portion of the bracket;

an insert mounted in the axial hole of the grommet, the insert including an opening; and a mounting stud received in the opening of the insert.

2. The mounting arrangement of claim 1 wherein the recessed portion of the bracket extends in a lateral direction from the main portion of the bracket.

3. The mounting arrangement of claim 1 wherein the transitional portion partially encircles the annular ring.

4. The mounting arrangement of claim 1 wherein the annular ring is provided on one side of the bracket and the annular lip is provided on an opposite side of the bracket.

5. The mounting arrangement of claim 1 wherein the recessed portion of the bracket is received in the annular groove of the grommet.

6. The mounting arrangement of claim 1 wherein the annular ring has an outer torus shape.

7. A mounting arrangement of a vehicular braking system comprising:

a hydraulic control unit;

a bracket having a hole surrounded by a recessed portion laterally spaced from a main portion by a transitional portion;

a grommet mounted in the hole of the bracket, the grommet including an axial hole and an annular ring separated by an annular groove from an annular lip, wherein the annular ring is supported by the transitional portion of the bracket;

an insert mounted in the axial hole of the grommet, the insert including an opening; and a mounting stud received in the opening of the insert and secured to the hydraulic control unit.

8. The mounting arrangement of claim 7 wherein the recessed portion extends in a lateral direction toward the hydraulic control unit.

9. The mounting arrangement of claim 7 wherein the transitional portion of the bracket has an arcuate shape.

10. The mounting arrangement of claim 7 wherein the insert includes an annular flange that supports the annular ring of the grommet.

11. The mounting arrangement of claim 10 wherein said annular flange of said insert has an arcuate shape for supporting the annular ring in both axial and lateral directions.

12. The mounting arrangement of claim 7 wherein the recessed portion of the bracket is received in the annular groove of the grommet.

13. The mounting arrangement of claim 7 wherein a gap is provided between the annular lip of the bracket and the hydraulic control unit.

14. The mounting arrangement of claim 7 wherein the annular ring has an outer torus shape.

15. The mounting arrangement of claim 7 wherein the annular ring has cross section greater than a cross section of the annular lip.

16. The mounting arrangement of claim 7 wherein the transitional portion partially encircles the annular ring.

17. The mounting arrangement of claim 7 wherein the annular ring is provided on one side of the bracket and the annular lip is provided on an opposite side of the bracket.

* * * * *